(12) United States Patent
Jaipaul

(10) Patent No.: US 9,884,751 B2
(45) Date of Patent: Feb. 6, 2018

(54) BATTERY OPERATED VEHICLE LIFTS WITH WIRELESS CHARGING

(71) Applicant: Gray Manufacturing Company, Inc., St. Joseph, MO (US)

(72) Inventor: Larry M. Jaipaul, Clarence, NY (US)

(73) Assignee: Gray Manufacturing Company, Inc., St. Joseph, MO (US)

(*) Notice: Subject to any disclaimer, the term of this patent is extended or adjusted under 35 U.S.C. 154(b) by 328 days.

(21) Appl. No.: 14/857,376

(22) Filed: Sep. 17, 2015

(65) Prior Publication Data

US 2017/0081158 A1    Mar. 23, 2017

(51) Int. Cl.
| | |
|---|---|
| B66F 7/00 | (2006.01) |
| B66F 3/46 | (2006.01) |
| H02J 7/02 | (2016.01) |
| H01Q 21/30 | (2006.01) |
| H01Q 1/00 | (2006.01) |
| H01Q 1/24 | (2006.01) |
| B66C 13/14 | (2006.01) |
| H02J 50/00 | (2016.01) |
| H02J 50/90 | (2016.01) |
| H01Q 9/16 | (2006.01) |

(52) U.S. Cl.
CPC ........... *B66F 3/46* (2013.01); *B66C 13/14* (2013.01); *H01Q 1/007* (2013.01); *H01Q 1/248* (2013.01); *H01Q 21/30* (2013.01); *H02J 7/025* (2013.01); *H02J 50/00* (2016.02); *H02J 50/90* (2016.02); *H01Q 9/16* (2013.01)

(58) Field of Classification Search
CPC ... B66F 3/46; H02J 50/90; H02J 50/00; H02J 7/025; B66C 13/14; H01Q 1/007; H01Q 1/248; H01Q 21/30; H01Q 9/16
USPC ....... 187/203, 209, 210, 211, 218, 219, 289, 187/290, 391, 393; 320/103, 104, 108, 320/109, 113, 115; 307/66, 69, 10.1
See application file for complete search history.

(56) References Cited

U.S. PATENT DOCUMENTS

| | | | | |
|---|---|---|---|---|
| 4,496,896 A | * | 1/1985 | Melocik | B60K 1/04 320/108 |
| 6,634,461 B1 | * | 10/2003 | Baker | B66F 3/46 187/210 |
| 7,219,770 B2 | * | 5/2007 | Baker | B66F 3/46 187/210 |
| 7,500,816 B2 | * | 3/2009 | Berends | B66F 3/46 187/210 |
| 7,815,017 B2 | * | 10/2010 | Robbin | B65G 35/06 187/203 |
| 8,083,034 B2 | * | 12/2011 | Bordwell | B66F 7/20 187/210 |
| 8,251,184 B2 | * | 8/2012 | De Jong | B66F 7/16 187/210 |
| 8,869,944 B2 | * | 10/2014 | McCabe | B66F 9/24 187/220 |
| 9,193,572 B2 | * | 11/2015 | Finkbeiner | B66F 3/44 |

(Continued)

*Primary Examiner* — Anthony Salata
(74) *Attorney, Agent, or Firm* — Hovey Williams LLP

(57) ABSTRACT

A portable vehicle lift with a wireless charging system. The vehicle lift comprises a base, a carriage configured for receiving a wheel of a vehicle, a lift actuator configured to vertically raise and lower the carriage relative to the base, and a battery configured to provide electrical power to the vehicle lift. The vehicle lift additionally includes a receiver electrically coupled with the battery, and a transmitter for transmitting electrical energy to the receiver.

20 Claims, 10 Drawing Sheets

(56) References Cited

U.S. PATENT DOCUMENTS

| | | | | |
|---|---|---|---|---|
| 9,346,365 B1* | 5/2016 | Penilla | ................... | B60L 11/18 |
| 9,352,944 B2* | 5/2016 | Fagan | ....................... | B66F 3/46 |
| 9,381,878 B2* | 7/2016 | Ichikawa | ................ | B60L 1/006 |
| 9,673,664 B2* | 6/2017 | Nakamura | .............. | H02J 50/12 |

* cited by examiner

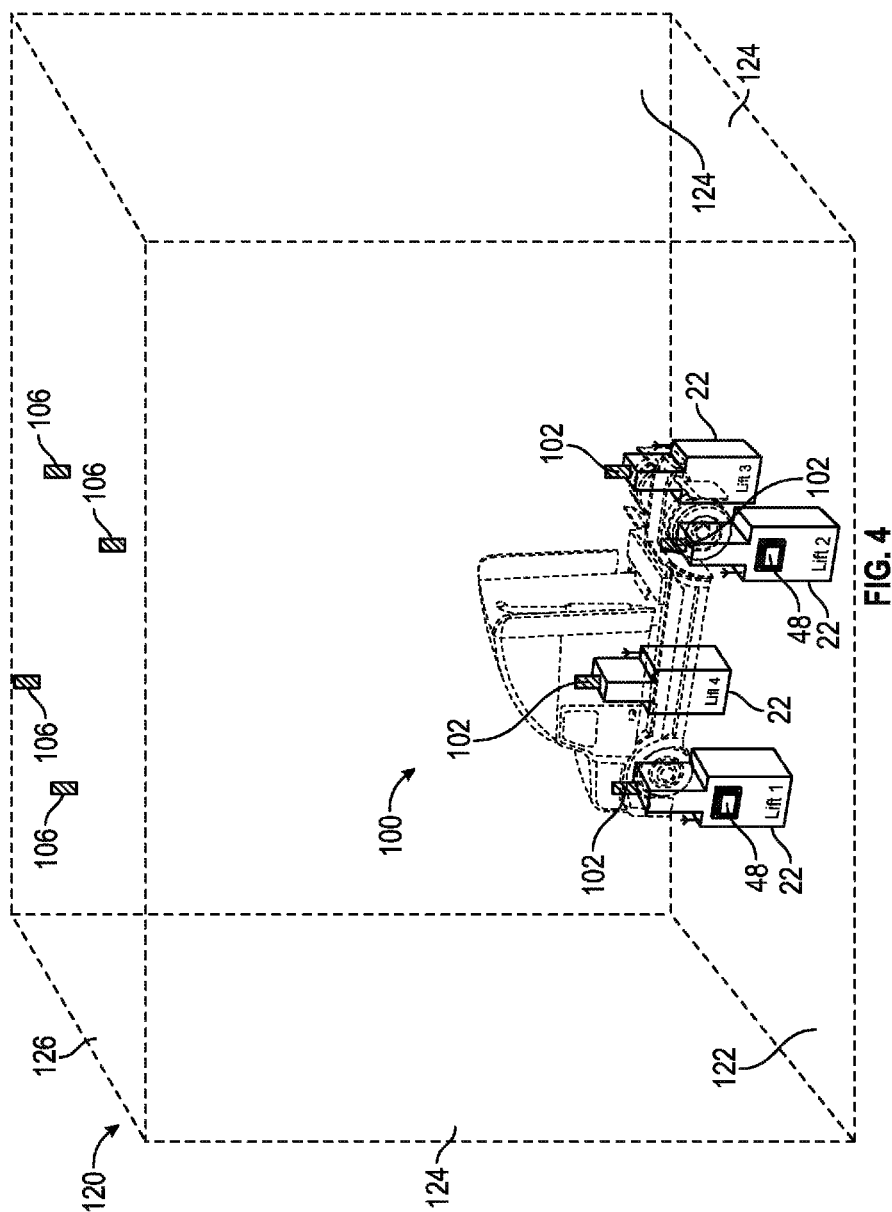

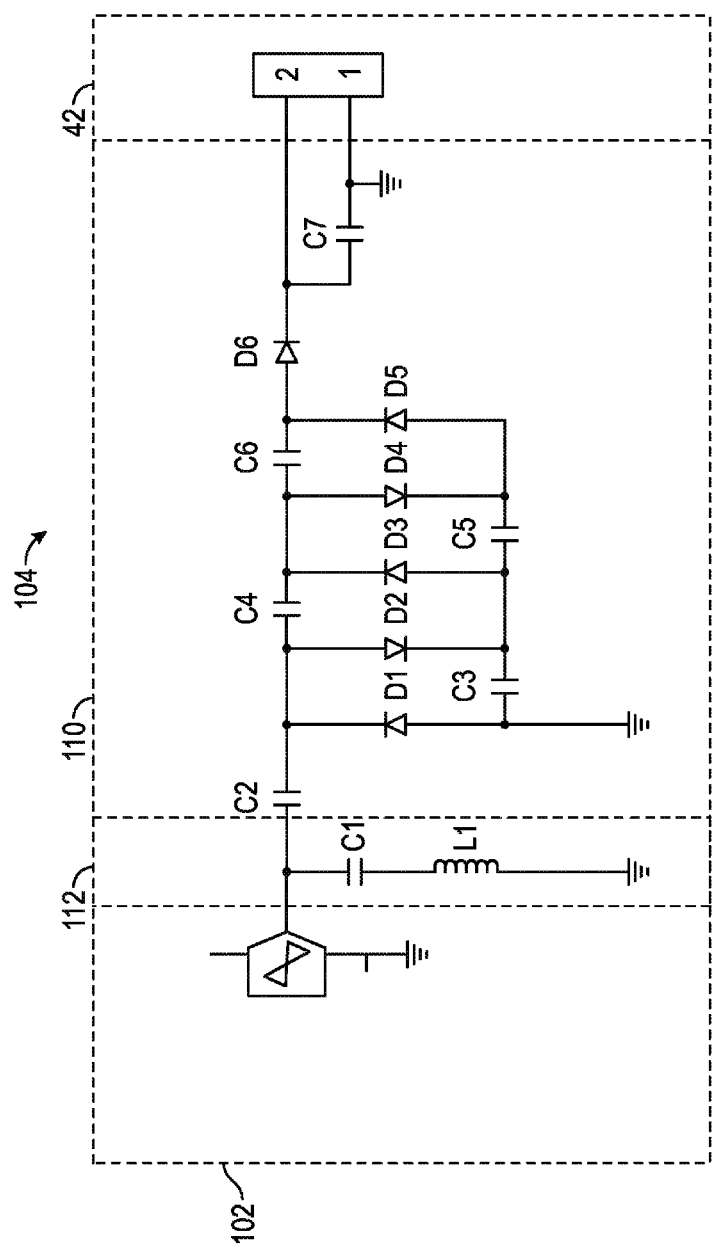

BATTERY OPERATED VEHICLE LIFTS WITH WIRELESS CHARGING

BACKGROUND

1. Field of the Invention

The present invention relates generally to vehicle lift systems. More particularly, the invention concerns a battery-operated vehicle lift system configured for wireless charging.

2. Description of the Prior Art

The need to lift a vehicle from the ground for service work is well established. For instance, it is often necessary to lift a vehicle for tire rotation or replacement, steering alignment, oil changes, brake inspections, exhaust work, and other automotive maintenance. Traditionally, lifting a vehicle has been accomplished through the use of equipment that is built-into a service facility, such as either lift units with hydraulic actuator(s) installed below the surface of the floor or two and four-post type lift systems installed on the floor surface. These built-in units are located at a fixed location at the service facility and adapted to engage a vehicle frame to lift the vehicle from the ground.

In an effort to increase the versatility and mobility of lift devices and to reduce the need to invest in permanently mounted lifting equipment, devices commonly known as a mobile column lifts (MCLs) have been developed. An example of MCLs incorporated in a wireless portable vehicle lift system 20 is illustrated in FIG. 1, which illustrates a vehicle lift system 20 with four individual lifts 22 for lifting a vehicle. Although FIG. 1 depicts a four lift system, any combination of two or more lifts 22 may be used. It should also be understood that lift system 20 is not limited for use with vehicles, but also may be used to raise or lower other objects relative to a floor or ground surface, such as aircraft, industrial machinery, shipping containers, construction subassemblies, and the like.

An example of a vehicle lift 22 included in such a vehicle lift system 20 is illustrated in more detail in FIGS. 2, 3A, and 3B. The vehicle lift 22 illustrated in FIGS. 2, 3A, and 3B is similar to vehicle lifts described in U.S. Patent App. Publ. No. 2013/0240300, which is incorporated herein by reference in its entirety. With reference to FIG. 2, the vehicle lift 22 broadly includes a base 30, a post 32, a carriage assembly 34, a lift actuator 36, and a main housing 38. The base 30 supports the lift 22 on the floor or the ground. The post 32 is rigidly coupled to the base 30 and extends upwardly therefrom. The carriage assembly 34 is configured to engage a wheel of a vehicle and is vertically shiftable relative to the post 32. The lift actuator 36 is received in the post 32 and is operable to vertically raise and lower the carriage assembly 34 relative to the post 32 and the base 30. The main housing 38 is attached to the post 32 and encloses many of the components of that make up the control and power systems of the lift 22. The main housing 38 may also include a removable access panel 40 for providing access to various components of the lift's 22 control and power systems.

FIGS. 3A and 3B provide a view of the back of the lift 22. FIG. 3B shows the access panel 40 being removed and a lower portion of the main housing 38 cut away to show certain internal components located in the upper portion of the main housing 38. The lift 22 may generally include an electrical power supply, an electronic control system, and a hydraulic power system. More specifically, FIG. 3B shows that the electrical power supply system of the lift 22 can include two rechargeable batteries 42 (e.g., 12 VDC lead-acid batteries), a battery charger 44, and a main power switch 46; the electronic control system of the lift 22 can include a modular control unit 48 (e.g., with a touchscreen display 49) and a communications antenna 50; and the hydraulic power system of the lift 22 can include a hydraulic reservoir 52, a hydraulic pump 54, a hydraulic cylinder (not shown), and a plurality of hydraulic valves (not shown. The electronic control system can be used to control the hydraulic power system so as to control the raising and lowering operations of the lift 22.

The electrical power supply system (including the batteries 42) is configured to provide power to the individual systems of the lift 22, including the electronic control system and the hydraulic power system. As such, the electrical power supply system provides the electrical power necessary to control and operate the lifts 22. Generally, the batteries 42 of the electrical power supply system require frequent charging, so as to maintain sufficient charge to provide continued functionality of the lift 22 throughout a working day. However, it can be difficult keep the lift 22 physically coupled with a standard recharging power source, such as a mains power outlet, because the lift 22 is mobile and may be used in locations out of range of such standard recharging power sources. Furthermore, in some instances, the electrical cords generally used to electrically connect recharging power sources with the lift 22 may interfere with the operation and/or mobility of the lift 22, or may otherwise interfere with the maintenance being performed on the vehicle being raised by the lift. 22.

Accordingly, there exists a need for a vehicle lift 22 configured for wireless charging, such that the lift 22 can be continuously charged while the lift 22 is out of range of a physical recharging power source or when it is otherwise impractical to use a physical recharging power source. Although certain types of wireless power transfer devices have been used in the past for charging small-sized batteries (e.g., as may be used in small, handheld computing devices), such previously-used wireless power transfer devices have generally been restricted to transferring electrical power over small distances (i.e., over the near-field). The near-field refers to a region around a wireless power transfer device's antenna where magnetic fields and electric fields exist independently (i.e., generally a distance less than one or two wavelengths of the emitted electromagnetic signal). Because the magnetic and electric fields exist independently within the near-field, interferences within the emitted electromagnetic field are high such that signals degrade quickly and are not useful for transferring power outside of the near-field. Regardless over the relatively short near-field, wireless power transfer devices are capable of facilitating generally high electrical power transfer via magnetic induction and/or capacitive coupling. Wireless power transfer device antennas that operate in the near-field (via magnetic induction and/or capacitive coupling) are not required to be very large, such that the antennas are easily incorporated into power transfer devices and into handheld computing devices. As such, most previously-used wireless power transfer devices have been used to re-charge the batteries of small, handheld computing devices, such as a smart-phones and tablets over relatively short distances (i.e., the near-field).

To accomplish wireless power transfer over longer distances (i.e., beyond the near-field), power transfer must be completed in the far-field, which refers to distances greater than two wavelengths of the electromagnetic signal that is emitted from the transmitting antenna. However, most previously-used wireless power transfer devices are not configured to operate in the far-field. In more detail, to operate in the far-field, the transmitting and receiving antennas are generally required to be much larger than those smaller antennas used for operating in the near-field. Specifically, the amount of power emitted as an electromagnetic signal in the far-field by a transmitting antenna depends on a ratio of the antenna's size to the wavelength of the signal. For large wavelength signals transmitted by relatively-small antennas, generally little power is radiated. For instance, with the near-field power transmissions devices discussed above, which use generally small antennas, almost none of the energy is emitted in the far-field as electromagnetic radiation. On the other hand, relatively-larger antennas (i.e., antennas generally the same size as the signal's wavelength) can radiate power more efficiently in the far field. Nevertheless, the electromagnetic signals radiated by such fair-field-capable antennas radiate such signals in all directions (i.e., omni-directionally). As a result, the amplitude of the electromagnetic signal falls off proportionally with distance, such that the available energy per unit area falls off proportionally with a square of the distance. Thus, if the transmitting and receiving antennas are far apart, only a small amount of the emitted radiation will be available to be received by the receiving antennas for conversion to power. Because of these difficulties, wireless power transfer over the far-field has received little attention or implementation.

As such, there is a need for a vehicle lift system configured to provide wireless charging to the lift 22 such that the batteries 42 of the lifts 22 can remain sufficiently charged even when the lifts 22 are out of range of a physical recharging power source or when it is otherwise impractical to use a physical recharging power source. Furthermore, there is a need for a wireless charging system for vehicle lifts that provides efficiently wireless charging over the near-field and far-field.

SUMMARY OF THE INVENTION

In one embodiment of the present invention, there is provided a portable vehicle lift with a wireless charging system. The lift comprises a base, a carriage configured for receiving a wheel of a vehicle, a lift actuator configured to vertically raise and lower the carriage relative to the base, and a battery configured to provide electrical power to the vehicle lift. The lift additionally includes a receiver electrically coupled with the battery. The charger would also include a transmitter for transmitting electrical energy to the receiver.

In another embodiment of the present invention, there is provided a wireless charging system for a vehicle lift. The system comprises at least one vehicle lift including a base, a carriage configured for receiving a wheel of a vehicle, a lift actuator configured to vertically raise and lower the carriage relative to the base, and a battery configured to provide electrical power to the vehicle lift. The charging system additionally includes a plurality of transmitters for transmitting electrical energy, with the transmitters generally arranged in a circular pattern. The charging system additionally includes a receiver for receiving at least a portion of the electrical energy transmitted by the transmitters, with the receiver being associated with the vehicle lift and electrically coupled with the battery. The charging system further includes a power control system for conditioning the electrical energy received by the receiver.

In another embodiment of the present invention, there is provided a process for wirelessly providing power to a portable vehicle lift. The process includes the step of arranging two or more transmitters for wirelessly emitting electrical energy through a charging space. An additional step includes positioning the vehicle lift within the charging space. An additional step includes wirelessly providing electrical energy from the transmitter to a receiver associated with the vehicle lift and directing the energy to a battery associated with the vehicle lift. An additional step includes providing instructions to an electronic control system of the vehicle lift to raise a carriage associated with the vehicle lift, with the carriage being raised in response to the instructions provided. An additional step includes providing instructions to the electronic control system of the vehicle lift to lower the carriage associated with the vehicle lift, with the carriage being lowered in response to the instructions provided. The electronic control system is powered by the battery associated with the vehicle lift.

BRIEF DESCRIPTION OF THE DRAWINGS

FIG. 4 is a simplified representation of a wireless charging vehicle lift system according to embodiments of the present invention, with the system including power transmitters positioned on a ceiling of a service facility and power receivers positioned on portable lifts of the lift system;

FIG. 6 is a circuit diagram of a power receiving antenna and a power control system according to embodiments of the present invention;

DETAILED DESCRIPTION OF EMBODIMENTS

Figure 1:
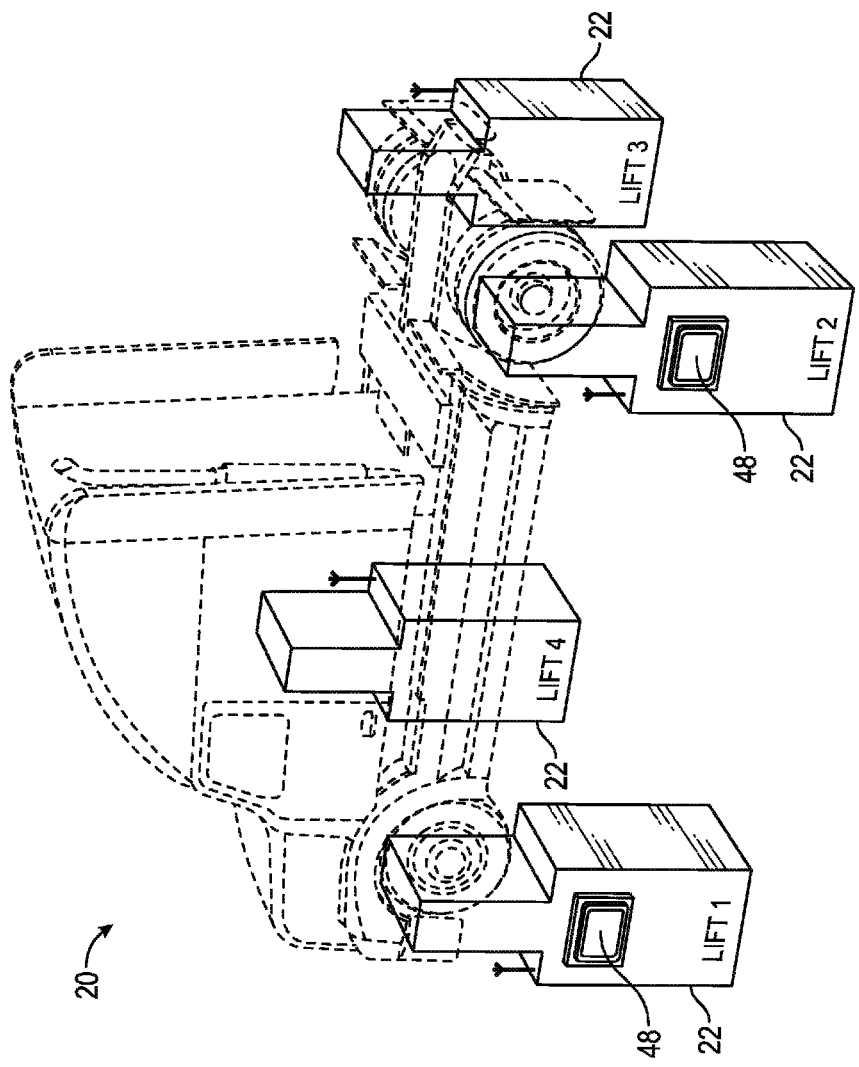
FIG. 1 is a simplified representation of a wireless portable lift system utilizing four individual lifts to perform a coordinated lift of a vehicle.
Figure 2:
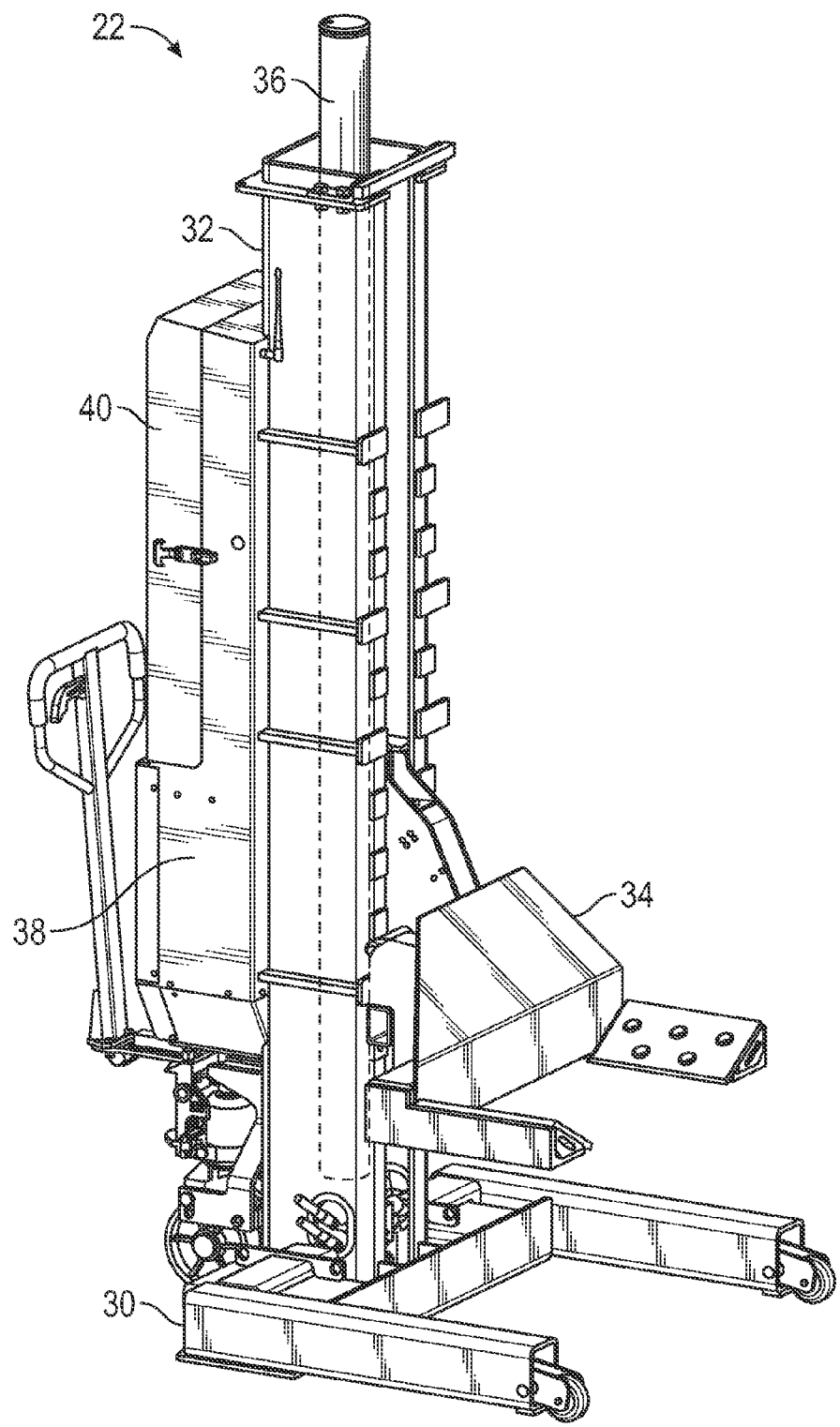
FIG. 2 is a perspective view showing a front and a side of an individual wireless portable lift, such as may be used in the system of FIG. 1.
Figure 3A:
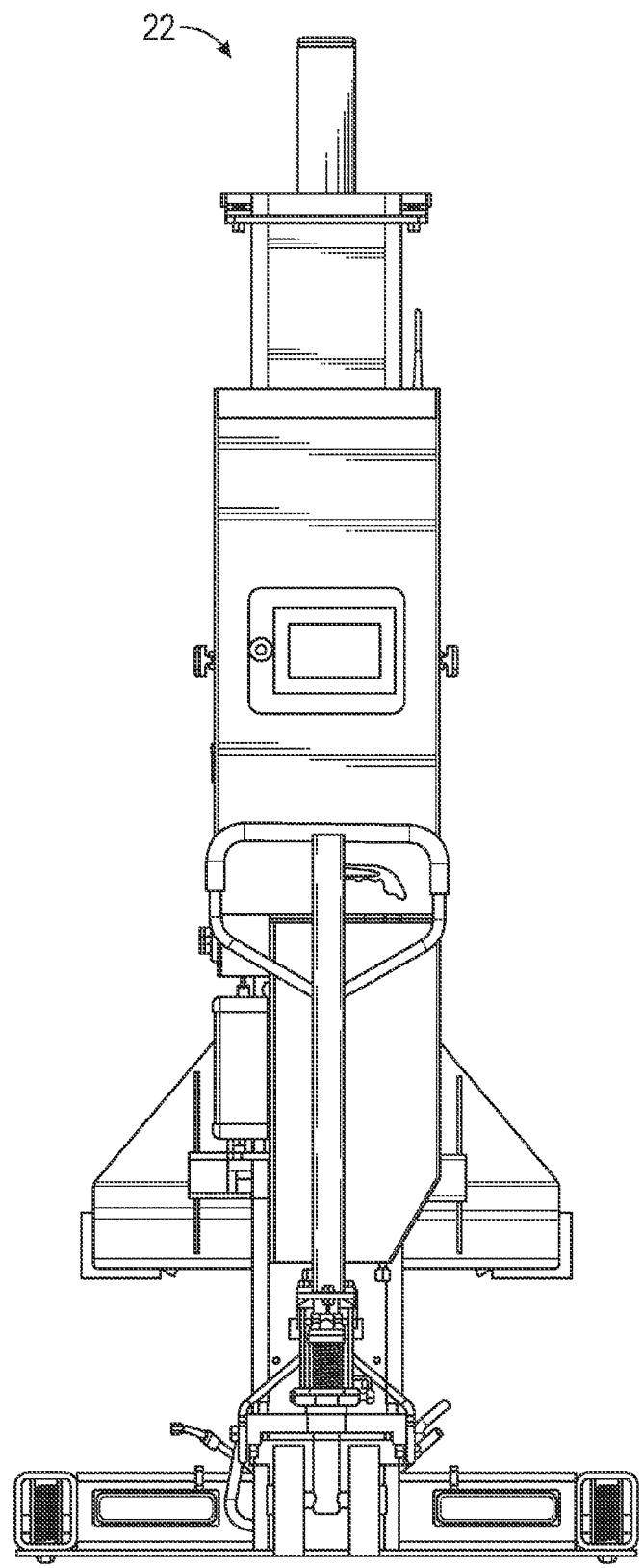
FIG. 3A is a back elevation view of the wireless portable lift of FIG. 2.
Figure 3B:
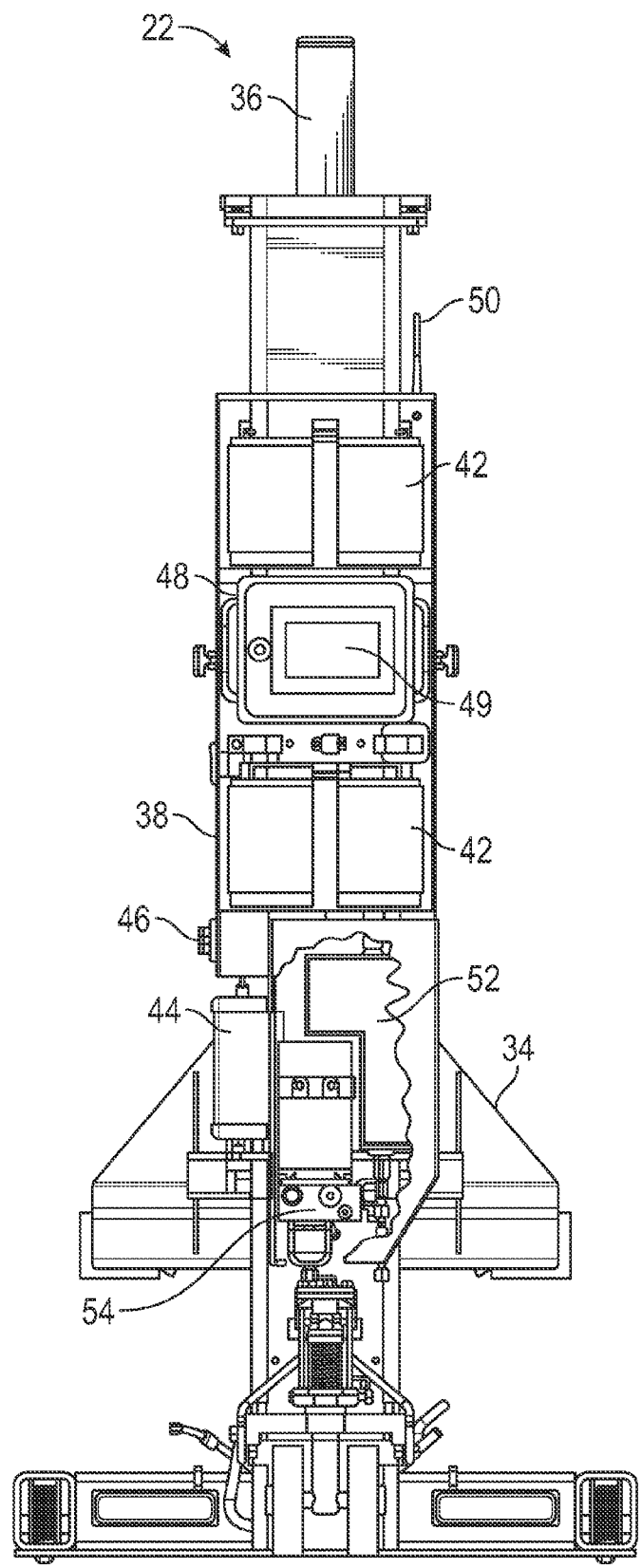
FIG. 3B is a back elevation view of the wireless portable lift of FIGS. 2 and 3A, with certain portions of a main housing of the lift being remove or cut away to show individual components of the lift's electrical supply system, electronic control system, and hydraulic power system.

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As illustrated in FIG. 4, embodiments of the present invention comprise a wireless charging vehicle lift system 100 configured to provide wireless power to each of the individual lifts 22 included in the lift system 100. In more detail, the lift system 100 includes one or more lifts 22, one or more power receivers in the form of power receiving antennas 102 associated with each lift 22 and in electrical communication with the batteries 42 of the lift 22, a power control system 104 (not shown in FIG. 4) associated with the power receiving antennas 102, and one or more power transmitters in the form of power transmitting antennas 106 spaced apart from the lifts 22 and configured to transmit electrical power to the power receiving antennas 102. Through the use of the power receiving and transmitting antennas 102, 106, embodiments of the present invention are configured to overcome the previously-described issues related to charging batteries 42 of a lift 22 via a physical connection. Specifically, because the power receiving and transmitting antennas 102, 106 are configured to receive and transmit electrical power wirelessly, the batteries 42 of the lifts 22 can be charged wirelessly (i.e., without the need for a physical connection).

In more detail, embodiments of the present invention provide for the power transmitting antennas 106 to each comprise any type of transmitting device capable of emitting time-varying electromagnetic waves or signals. In more detail, the power transmitting antennas 106 may be connected to a power source, such as mains power, and may be configured to convert the power from the power source into a time-varying electromagnetic wave. To convert the power into the time-varying electromagnetic wave, the power transmitting antennas 106 may comprise various types of antennas, such as monopole antennas, dipole antennas, or variations and/or combinations thereof. As specific examples, monopole antennas contemplated for use as power transmitting antennas 106 may comprise whips (i.e., metal rods), T antennas, inverted L antennas, umbrella antennas, or the like. Dipole antennas may include, for instance, yagi-uda antennas, log periodic antennas, turnstile antennas, corner reflector antennas, patch antennas, or the like. In some embodiments, the power transmitting antennas 106 may comprise directional antennas (i.e., high-gain antennas) configured to transmit electromagnetic waves over a relatively focused, narrow beam width. Such directional antennas may comprise parabolic antennas, helical antennas, yagi antennas, phased arrays, and the like. In further embodiments, the power transmitting antennas 106 may include other simple structures such as conductive coils (i.e., loop antennas), rectangular plates, circular plates, or the like.

Similarly, embodiments of the present invention provide for the power receiving antennas 102 to comprise any type of receiving device capable of receiving a time-varying electromagnetic wave and providing for the received electromagnetic wave to be converted into electrical power. As will be described in more detail below, the power receiving antennas 102 may be associated with the power control system 104 so as to control and condition the electrical power converted from the electrical wave received by the power receiving antennas 102. To receive the time-varying electromagnetic wave, the power receiving antennas 102 may comprise various types of antennas, such as monopole antennas, dipole antennas, or variations thereof. As specific examples, monopole antennas contemplated for use with power receiving antennas 102 may comprise whips (i.e., metal rods), T antennas, inverted L antennas, umbrella antennas, or the like. Dipole antennas may include, for instance, yagi-uda antennas, log periodic antennas, turnstile antennas, corner reflector antennas, patch antennas, or the like. In some embodiments, the power receiving antennas 102 may comprise directional antennas (i.e., high-gain antennas) configured to receive electromagnetic waves having a relatively focused, narrow beam width. Such directional antennas may comprise parabolic antennas, helical antennas, yagi antennas, phased arrays, and the like. In further embodiments, the power receiving antennas 102 may include other simple structures such as conductive coils and/or loop antennas, flat panels (e.g., rectangular plates, circular plates, or the like), etc., or combination thereof. In some embodiments, the type of antennas comprising the power receiving antennas 102 may be the same as those comprising the power transmitting antennas 106.

Given the above, it should be understood that the receiving and transmitting antennas 102, 106 may comprise generally any type of antenna that is capable of operating in the near-field, in the far-field, or in a combination of the near and fair-fields. In certain specific embodiments, such as when operating in the near-field, the receiving and transmitting antennas 102, 106 may be configured to operate in low frequencies, e.g., 0 to 75 Hz. (It is understood that frequency is inversely proportional to wavelength, such that a relatively low frequency corresponds to a relatively large wavelength). Alternatively, if the distance between the power receiving and transmitting antennas 102, 106 is large, such as within the fair field of the transmitting antenna 106, then the power receiving and transmitting antennas 102, 106 may include various types of antennas configured to operate at frequencies ranging from about 50 KHz to up to about 10 GHz.

In more detail, the particular type of antenna used for the power receiving and transmitting antennas 102, 106 may depend on specific requirements of the lift system 100. For instance, if the distance between the power receiving and transmitting antennas 102, 106 is small, such as the distance being within the near-field of the transmitting antenna 106, then the power receiving and transmitting antennas 102, 106 may simply comprise magnetic inductors or capacitive couplers. In the case of magnetic inductors, the power receiving and transmitting antennas 102, 106 may simply comprise loop antennas. In the case of capacitive couplers, the receiving and transmitting antennas 102, 106 may simply comprise metal plates. As such, the receiving and transmitting antennas 102, 106 will be magnetically or capacitively coupled over the near-field.

Alternatively, if the distance between the power receiving and transmitting antennas 102, 106 is large, such as within the fair field of the transmitting antenna 106, then the power receiving and transmitting antennas 102, 106 may include various types of antennas configure to transmit and receive electromagnetic waves in the fair-field, such as monopole and dipole antennas discussed in more detail below. In specific situations in which the configuration of the lift system 100 allows for an uninterrupted line of sight between the power receiving and transmitting antennas 102, 106, the power receiving and transmitting antennas 102, 106 may comprise flat panel antennas configured to operate around 2.4 GHz. Such high frequency antennas are preferably used in situations where an uninterrupted line of sight exists between the power receiving and transmitting antennas 102, 106. In other embodiments, such as when an uninterrupted line of sight between the power receiving and transmitting antennas 102, 106 does not exist, the power receiving and transmitting antennas 102, 106 may comprise coil antennas configured to operate around 135 KHz. Such low frequency antennas are preferably used in situations where an uninterrupted line of sight does not exist between the power receiving and transmitting antennas 102, 106 because such low frequencies are capable of being at least partially transmitted through obstacles/obstructions. Nevertheless, as described above, embodiments of the present invention contemplate the use of various types of antennas configure to operate at frequencies ranging from about 50 KHz to about 10 GHz.

Regardless of the specific type of antennas used, the power receiving and transmitting antennas 102, 106 may each be configured to be received in a housing 108 (See FIGS. 5A and 5B), such as a non-conductive enclosure. As such, the particular type of antenna received within the housing 108 may not be immediately recognizable from outside of the housing 108. With continue reference to FIGS. 5A and 5B, the housing 108 that receives the power receiving antenna 102 may be positioned on the lift 22, such that the lift's 22 electrical power supply system may be electrically coupled (directly or indirectly) to the power receiving antenna 102 for purposes of charging the batteries 42. In addition to the power receiving antenna 102, the power control system 104 may likewise be contained within the housing 108.

The power control system 104 may include various components necessary for conditioning the electromagnetic wave (i.e., an AC signal) received via the power receiving antenna 102, such that the AC signal can be converted into a DC signal capable of charging the batteries 42 of the lift 22. For instance, the power control system 104 may include a charge controller for conditioning the DC signal to voltage and current level suitable for storage in the batteries 42. For instance, the charge controller may comprise a rectifier configured for converting the AC signal emitted from the power transmitting antenna 106 and received via the power receiving antenna 102 into a DC signal. In some embodiments, the charge controller may further comprise one or more filters for assisting in providing a stabilized DC signal to the batteries 42. In still further embodiments, such as illustrated in FIG. 6, the charge controller may include a voltage multiplier 110, such as a Villard cascade, which is used to increase and/or scale the voltage level of the AC signal received by the power receiving antenna 102 into a DC signal with a voltage level suitable for storage in the batteries 42 of the associated lift 22. As shown in FIG. 6, the voltage multiplier 110 may comprise a multi-stage capacitor-diode pair circuit (i.e., C2-C6 and D1-D5) located between the power receiving antenna 102 and the batteries 42 of the lift 22. In some additional embodiments, the charge controller may include a high-efficiently switching regulator for converting the AC signal emitted from the power transmitting antenna 106 and received via the power receiving antenna 102 into a DC signal.

In further embodiments, as illustrated in FIG. 6, the power control system 104 may include a resonance control circuit 112 for adjusting the resonance of the power receiving antenna 102 to match that of the power transmitting antenna 106. For instance, the power control system 104 may include an LC circuit (i.e., an inductor L1 and capacitor C1 circuit). In some embodiment, the properties of the inductor L1 and/or the capacitor C1 of the resonance control circuit 112 may be varied (e.g., via a variable capacitor) so as to form a variable tuned circuit. As such, the resonance control circuit 112 can be adjusted to allow the resonance of the power receiving antenna 102 to match the resonance of the power transmitting antenna 106.

In one or more embodiments, the components of the power control system 104 may all be incorporated within the same housing 108 that contains the power receiving antenna(s) 102. In other embodiments, the components of the power control system 104 may be positioned elsewhere on the lift 22, such as along with the lift's 22 electronic control system. The functionality of the power control system 104 may be automated, such that the power control system 104 may further comprise one or more electronic processors (e.g., processors, microprocessors, microcontrollers, etc.) and associated memory elements. As such, the power control system 104 may perform various functions, such as sensing the electrical power being received by the power receiving antenna 102 and determining whether such power needs to be conditioned (e.g., increased and/or scaled) for storage in the lifts' 22 batteries 42. In some embodiments, the power control system 104 may be configured to obtain and utilize information from other components of the lift 22, such as the batteries 42, so as to determine (1) when to begin charging the batteries 42, (2) how long to charge the batteries 42, and (3) how much electrical power should be used to charge the batteries 42. For instance, if the power control system 104 determines that the charge of the batteries 42 has dropped below a predefined minimum level, the power control system 104 may begin charging the batteries 42 via the electrical power received from the power receiving antenna 102.

Figure 5A:
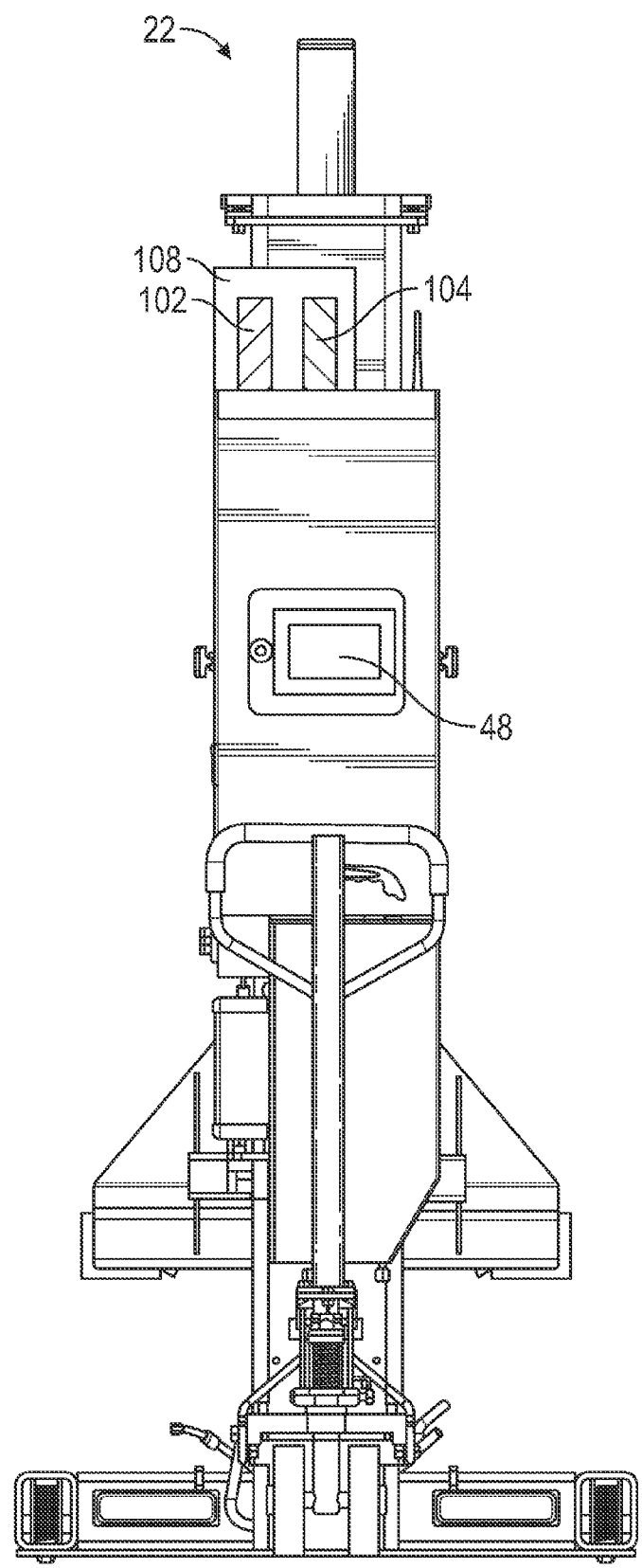
FIG. 5A is a back elevation view of a portable lift from the system FIG. 4, particularly showing the power receiver and a power control system housed within a housing on the lift.
Figure 5B:
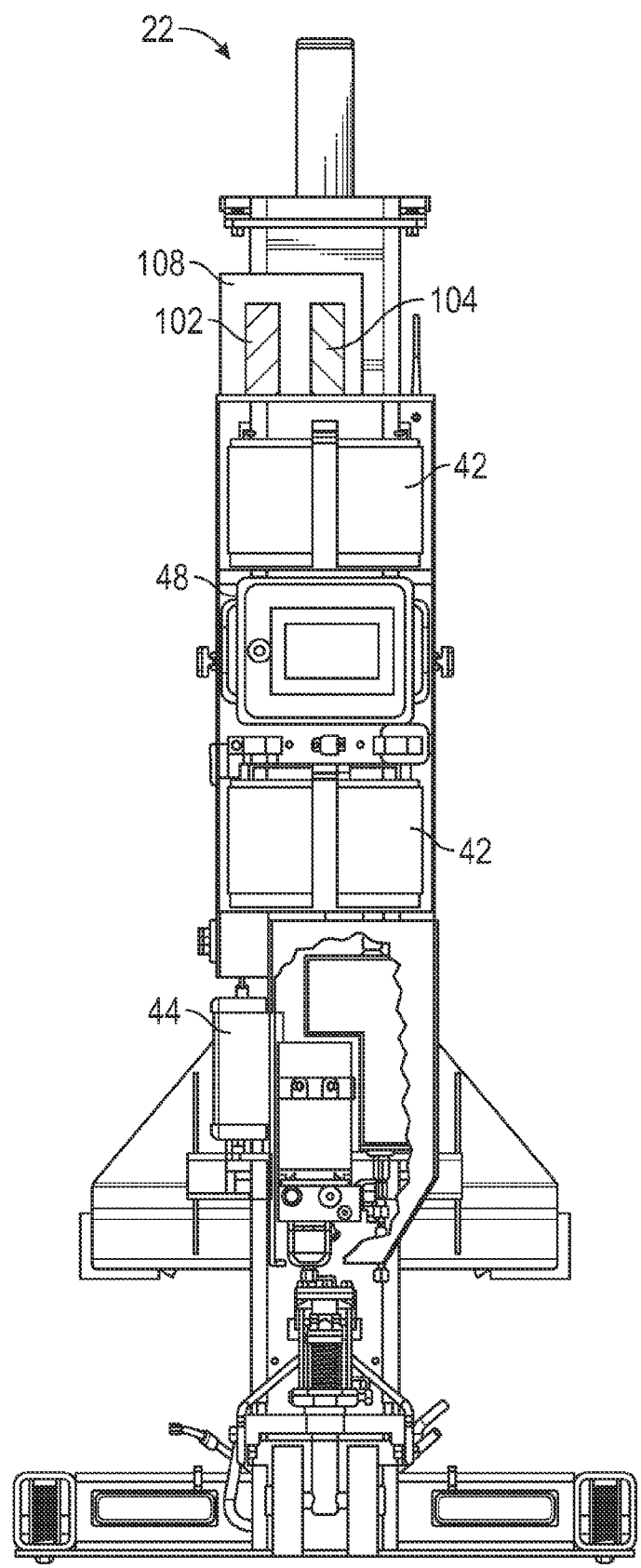
FIG. 5B is a back elevation view of the portable lift from FIGS. 4 and 5A, particularly showing the electrical power receiver and the power control system housed within the housing, with certain portions of the lift's main housing being removed or cut away to show individual components of the lift's electrical supply system, electronic control system, and hydraulic power system.

Given the above, the lift system 100 is configured to wirelessly charge the lift 22 by wirelessly transmitting electrical power from the power transmitting antenna 106 to the power receiving antenna 102. Because the amount of power available to be received by the power receiving antenna 102 falls off with increasing distance from the power transmitting antenna 106, it may be preferable to position the power transmitting antennas 106 and the power receiving antennas 102 as close together as possible, while maintaining the portability of the lift 22. For example, as illustrated in FIG. 4, in instances where the lift system 100 is used within an enclosed service facility, such as a shop 120 with a floor 122, side walls 124, and a ceiling 126, one or more power transmitting antennas 106 can be incorporated on and/or within the ceiling 126 of the shop 120. To ensure that the distance between the power transmitting antennas 106 and the power receiving antennas 102 is minimized, the power receiving antennas 102 may be located on a top portion of the lift 22. For instance, as was previously described, the power receiving antennas 102 may be retained within the housing 108, and such housing 108 may be positioned on the top portion of the lift 22, as shown in FIGS. 4, 5A, and 5B.

In an alternative embodiment, one or more power transmitting antennas 106 can be incorporated on and/or within the floor 122 of the shop 120. To ensure that the distance between the power transmitting antennas 106 and the power receiving antennas 102 is minimized, the power receiving antennas 102, such as may be received within the housing 108, may be located on a bottom portion of the lift 22. In still other embodiments, the one or more power transmitting antennas 106 may be incorporated elsewhere in the shop 120, such as on and/or within the side walls 124 of the shop 120.

Figure 7:
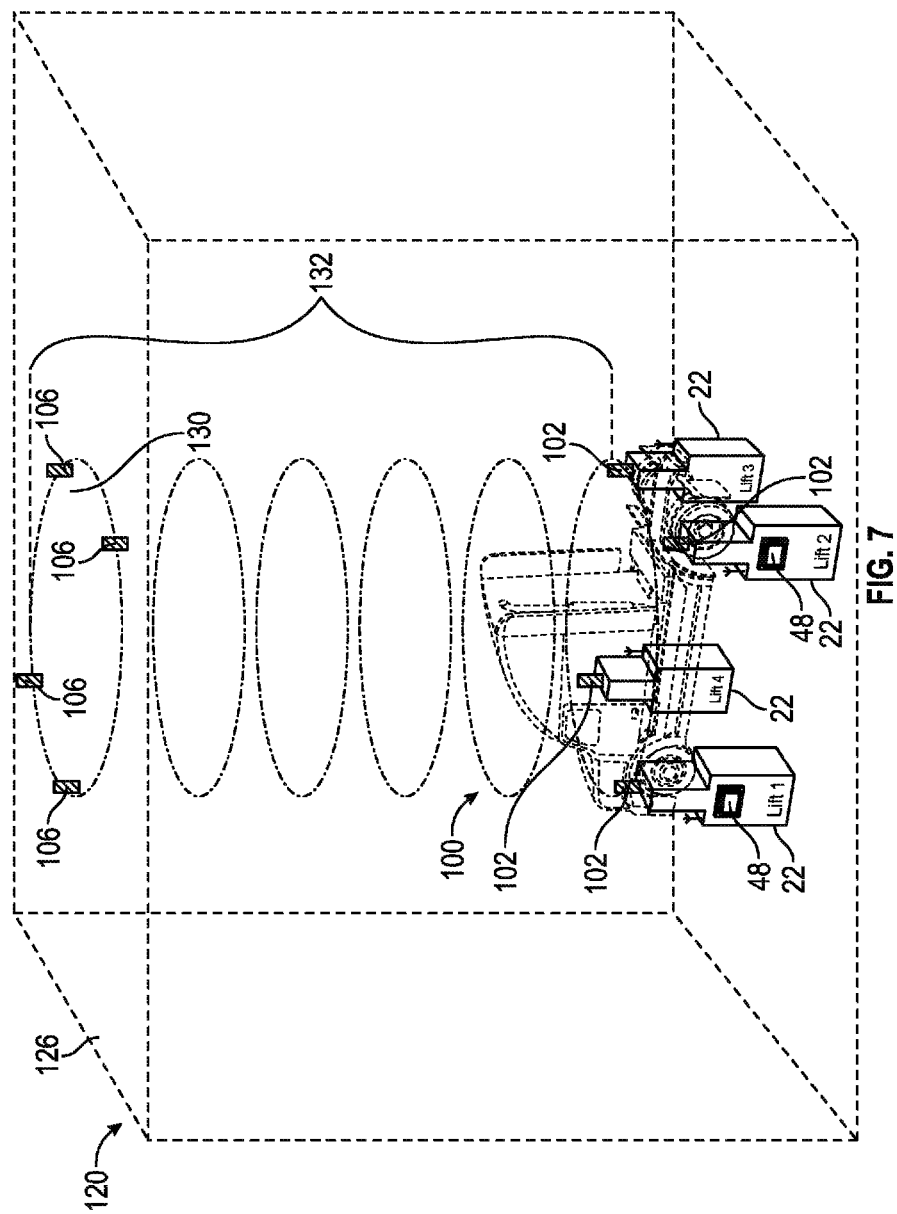
FIG. 7 is a simplified representation of the wireless charging vehicle lift system of FIG. 4, particularly showing the power transmitters transmitting electrical power through a charging space within the service facility.

To account for the inherent mobility of the lifts 22 in the lift system 100, some embodiments of the present invention may provide for a plurality of power transmitting antennas 106 to be specifically arranged within the shop 120, so as to allow the lifts 22 to be mobile and still enabled to be wireless charged. For instance, as perhaps best illustrated by FIG. 7, the plurality of power transmitting antennas 106 may be arranged to form a specific pattern defined by a generally bound area 130. For instance, the bound area 130 may be triangular, rectangular, circular, or the like. As a specific example, the power transmitting antennas 106 illustrated in FIG. 7 are arranged in a circle, such that the bound area 130 is circular. As a result, the power transmitting antennas 106 are configured to transmit electromagnetic waves downward from the ceiling 126 through a three-dimensional charging space 132 within an interior of the shop 120. The charging space 132 may broadly be described as a downward projection of the bound area 130, which is defined by the particular arrangement of the power transmitting antennas 106. For instance, as illustrated in FIG. 7, for embodiments of the present invention in which the power transmitting antennas 106 are circularly arranged so as to bound a circular area 130, the charging space 132 is presented as a cylinder extending from the ceiling 126 to the floor 122. As such, the lift 22 can be moved within the interior space of the shop 120, and will continue to be wirelessly charged as long as the lift 22 remains within the charging space 132. In alternative embodiments, such as when the bound area 130 is a shape other than circular (e.g., triangular, rectangular, etc.), the charging space 132 will be presented as a shape that generally corresponds to the bound area 130. In even further embodiments, the power transmitting antennas 106 may be scatteredly positioned on the entirety of the ceiling 126, such that the entire interior space of the shop 120 is a charging space 132. Embodiments of the present invention contemplate similar arrangements of the power transmitting antennas 106 on the floor of the shop 120.

Figure 8:
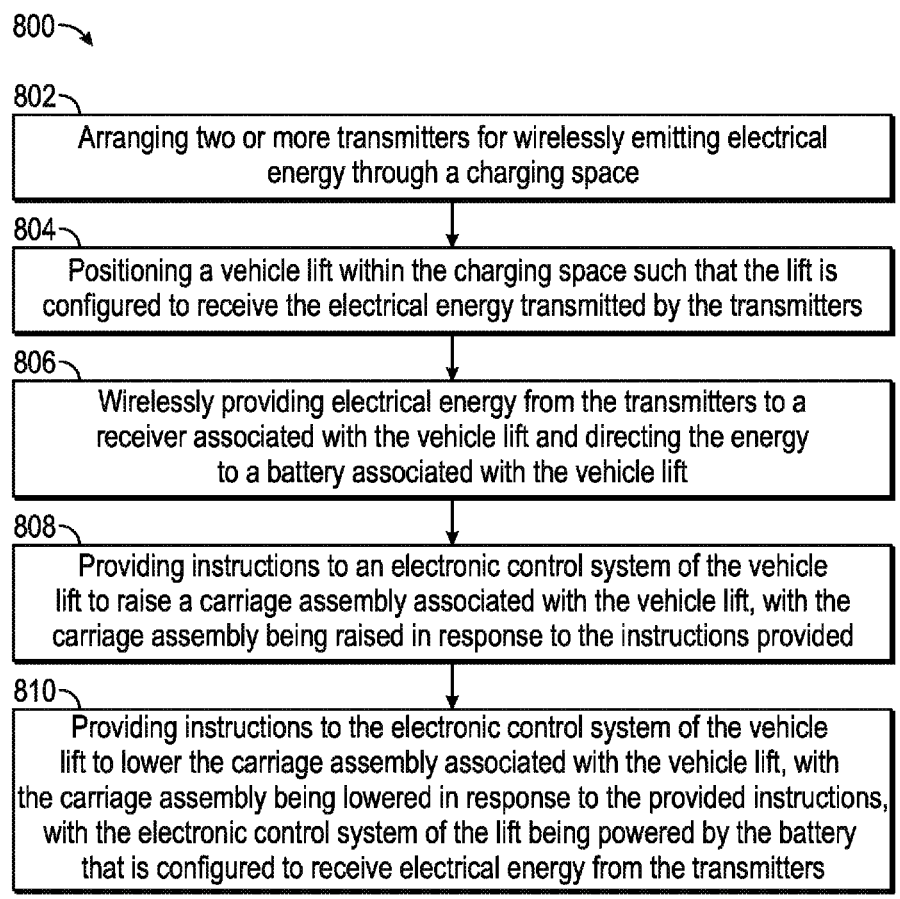
FIG. 8 is a flowchart of a method for wirelessly providing power to a portable vehicle lift according to embodiments of the present invention.

Given the description of the wireless charging vehicle lift system 100 described above, embodiments of the present invention further include a method 800 for wirelessly providing power to vehicle lifts 22. As illustrated in FIG. 8, the method 800 comprises Step 802 that includes arranging two or more power transmitters 106 for wirelessly emitting electrical energy through a charging space 132. An additional Step 804 includes positioning the vehicle lift 22 within the charging space 132 so as to be configured to receive the electrical energy transmitted by the transmitters 106. An additional Step 806 includes wirelessly providing electrical energy from the transmitters 106 to a receiver 102 associated with the vehicle lift 22 and directing the energy to a battery 42 associated with the vehicle lift 22. An additional Step 808 includes providing instructions to an electronic control system of the vehicle lift 22 to raise a carriage assembly 32 associated with the vehicle lift 22, with the carriage assembly 34 being raised in response to the instructions received. An additional Step 810 includes providing instructions to the electronic control system of the vehicle lift 22 to lower the carriage assembly 34 associated with the vehicle lift 22, with the carriage assembly 34 being lowered in response to the instructions received. It should be understood that the electronic control system of the lift 22 is powered by the batteries 42, which are configured to receive electrical energy from the transmitters 106.

The following description provides a specific embodiment a lift system 100 arranged according to the present invention. A plurality of power transmitting antennas 106 may be arranged on the ceiling 126 of a shop 120 in a circular manner, such as illustrated in FIG. 7, so as to generate the cylindrically-shaped charging space 132, as was previously described. Each of the power transmitting antennas 106 may comprise (1) a dipole antenna configured to generate an electromagnetic signal in the far-field, and (2) a loop antenna configured to generate an electromagnetic signal in the near-field. In addition, four individual lifts 22 positioned within the interior space of the shop 120 may each include (1) a power receiving antenna 102 that comprises a dipole antenna configured to receive the fair-field electromagnetic signal generated by the dipole antenna of the power transmitting antenna 106, and (2) a loop antenna configured to receive the near-field electromagnetic signal generated by the loop antenna of the power transmitting antenna 106.

Each lift 22 may also include a power control system 104 that includes components for converting the AC signal received by the power receiving antenna 102 into a DC signal. Specifically, for the dipole antenna of the power receiving antenna 102, the power control system 104 may include a resonance control circuit 112 (in the form of a variable LC circuit) for matching the resonance of the dipole antenna with the resonance of the power transmitting antenna 106. In addition, for the dipole antenna of the power receiving antenna 102, the power control system 104 may include a voltage multiplier/rectifier for converting the AC signal received by the dipole antenna to a DC signal and for increasing the voltage of the resultant DC signal for storage in the batteries 42 of the lift 22. For the loop antenna of the power receiving antenna 102, the power control system 104 may include a voltage multiplier/rectifier for converting the AC signal received by the loop antenna to a DC signal and for increasing the voltage of the resultant DC signal for storage in the batteries 42 of the lift 22.

Given the above, the ability of the power receiving antennas 102 to receive power in both the near-field and far-field, allows the power receiving antennas 102 to maximize the amount power received and converted into electrical energy for storage in the batteries 42 of the lifts 22. In such configurations, for instance, the power transmitting and receiving antennas 106, 102 may be configured to transmit and receive, respectively, electromagnetic signals sufficient to allow the batteries 42 of the lifts 22 to continuously trickle charge. For example, the power control system 104 may be configured to provide a charge to the batteries 42 of a given lift 22, via the electromagnetic signal received by the power receiving antenna 102, at a voltage of about 3 volts and 100 microamps (i.e., at a power of about 0.3 watts).

In addition to the above embodiment directed to an single power receiving antenna 102 with individual antennas for receiving electrical power in both the near-field and the far-field, embodiments of the present invention contemplate that a given lift 22 may be associated with a plurality of power receiving antennas 102, each interconnected in various permutations of series or parallel circuits, so as to be configurable to output the required DC voltage and current (i.e., electrical power) necessary to charge the batteries 42 of the lifts 22. Specifically, the power receiving antennas 102 on a given lift 22, with their outputs controlled by the power control system 104, should preferably be configured to output about 13.8 VDC so as to be able to sufficiently charge the 12 VDC batteries 42 of the lifts 22.

It is to be understood that while certain forms of the present invention have been illustrated and described herein, it is not to be limited to the specific forms or arrangement of parts described and shown.

The invention claimed is:
1. A vehicle lift with a wireless charging system, the vehicle lift comprising:
 a base;
 a carriage configured for receiving a wheel of a vehicle;
 a lift actuator configured to vertically raise and lower said carriage relative to said base;

a battery configured to provide electrical power to said vehicle lift;
a receiver electrically coupled with said battery; and
a transmitter for transmitting electrical power to said receiver.

2. The lift of claim 1, wherein said receiver and said transmitter each comprises an antenna configured to operate in an electromagnetic far-field.

3. The lift of claim 1, wherein said receiver and said transmitter each comprises an antenna configured to operate in an electromagnetic far-field and an antenna configured to operate in an electromagnetic near-field.

4. The lift of claim 2, wherein said receiver and said transmitter comprise directional antennas.

5. The lift of claim 1, further comprising a power control system for conditioning the electrical power received by said receiver for storage in said battery.

6. The lift of claim 5, wherein said power control system includes a resonance control circuit for adjusting a resonance of said receiver to match a resonance of said transmitter.

7. The lift of claim 5, wherein said power control system includes a voltage multiplier for scaling the voltage of the electrical power received by said transmitter for storage in said battery.

8. The lift of claim 1, wherein said receiver and said power control system are housed within a housing attached to said vehicle lift.

9. A wireless charging system for vehicle lifts, the system comprising:
at least one vehicle lift including—
a base,
a carriage configured for receiving a wheel of a vehicle,
a lift actuator configured to vertically raise and lower said carriage relative to said base,
a battery configured to provide electrical power to said vehicle lift;
a plurality of transmitters for transmitting electrical power, wherein said transmitters are generally arranged in a circular pattern;
a receiver for receiving at least a portion of the electrical power transmitted by said transmitters, wherein said receiver is associated with said vehicle lift and electrically coupled with said battery; and
a power control system for conditioning the electrical power received by said receiver.

10. The charging system of claim 9, wherein said receiver and said transmitter each comprises an antenna configured to operate in an electromagnetic far-field.

11. The charging system of claim 9, wherein said receiver and said transmitter each comprises an antenna configured to operate in an electromagnetic far-field and an antenna configured to operate in an electromagnetic near-field.

12. The charging system of claim 10, wherein said receiver and said transmitter comprise directional antennas.

13. The charging system of claim 9, wherein said power control system includes a resonance control circuit for adjusting a resonance of said receiver to match a resonance of said transmitters.

14. The charging system of claim 9, wherein said power control system includes a voltage multiplier for scaling the voltage of the electrical power received by said receivers for storage in said battery.

15. The charging system of claim 9, wherein said wireless charging system comprises a least four vehicle lifts.

16. A method for wirelessly providing power to a portable vehicle lift, wherein said method includes the following steps:
(a) arranging two or more transmitters for wirelessly emitting electrical energy through a charging space;
(b) positioning the vehicle lift within the charging space;
(c) wirelessly providing electrical energy from the transmitter to a receiver associated with the vehicle lift and directing the energy to a battery associated with the vehicle lift;
(c) providing instructions to an electronic control system of the vehicle lift to raise a carriage associated with the vehicle lift, wherein the carriage is raised in response to the instructions provided in step (c); and
(d) providing instructions to the electronic control system of the vehicle lift to lower the carriage associated with the vehicle lift,
wherein the carriage is lowered in response to the instructions provided in step (d),
wherein the electronic control system is powered by the battery associated with the vehicle lift.

17. The method of claim 16, wherein the transmitters are arranged on a ceiling of a service facility.

18. The method of claim 17, wherein the receiver is secured to an upper portion of the vehicle lift.

19. The method of claim 18, wherein the transmitters comprise directional antennas.

20. The method of claim 19, wherein the charge space comprises a generally three-dimensional cylindrical space within the service facility.

* * * * *